(12) United States Patent
Zhang et al.

(10) Patent No.: US 11,895,330 B2
(45) Date of Patent: Feb. 6, 2024

(54) NEURAL NETWORK-BASED VIDEO COMPRESSION WITH BIT ALLOCATION

(71) Applicant: Lemon Inc., Grand Cayman (KY)

(72) Inventors: Zhaobin Zhang, Los Angeles, CA (US); Li Zhang, Los Angeles, CA (US); Yue Li, Los Angeles, CA (US); Kai Zhang, Los Angeles, CA (US)

(73) Assignee: LEMON INC.

( * ) Notice: Subject to any disclaimer, the term of this patent is extended or adjusted under 35 U.S.C. 154(b) by 0 days.

(21) Appl. No.: 17/576,487

(22) Filed: Jan. 14, 2022

(65) Prior Publication Data

US 2022/0239944 A1    Jul. 28, 2022

Related U.S. Application Data

(60) Provisional application No. 63/141,059, filed on Jan. 25, 2021.

(51) Int. Cl.
*H04N 19/587* (2014.01)
*H04N 19/172* (2014.01)
(Continued)

(52) U.S. Cl.
CPC ........... *H04N 19/587* (2014.11); *G06N 3/045* (2023.01); *G06N 3/08* (2013.01); *H04N 19/105* (2014.11); *H04N 19/109* (2014.11); *H04N 19/124* (2014.11); *H04N 19/132* (2014.11); *H04N 19/147* (2014.11); *H04N 19/167* (2014.11);
(Continued)

(58) Field of Classification Search
CPC ...... G06N 3/0454; G06N 3/08; H04N 19/105; H04N 19/109; H04N 19/124; H04N 19/132; H04N 19/147; H04N 19/167; H04N 19/172; H04N 19/177; H04N 19/1883; H04N 19/31; H04N 19/587
See application file for complete search history.

(56) References Cited

U.S. PATENT DOCUMENTS

| | | | |
|---|---|---|---|
| 2008/0056354 A1* | 3/2008 | Sun | H04N 19/115 375/E7.176 |
| 2008/0165861 A1* | 7/2008 | Wen | H04N 19/176 375/E7.176 |

(Continued)

FOREIGN PATENT DOCUMENTS

| | | |
|---|---|---|
| CN | 102148973 A | 8/2011 |
| CN | 102165772 A | 8/2011 |

(Continued)

OTHER PUBLICATIONS

Abdelaziz Djelouah, Joaquim Campos, Simone Schaub-Meyer, and Christopher Schroers. Neural inter-frame com—pression for video coding. In ICCV, pp. 6421-6429, Oct. 2019.*

(Continued)

*Primary Examiner* — Mohammed S Rahaman
(74) *Attorney, Agent, or Firm* — Conley Rose, P.C.

(57) ABSTRACT

A method of video processing includes determining a target bitrate for a current video unit of a video that is based on a rate distortion function in which a rate portion is weighted using lambda, wherein lambda is a rational number and wherein lambda is an adaptively adjusted for each video unit of the video and performing a conversion between the current video unit and a bitstream of the video.

19 Claims, 12 Drawing Sheets

(51) Int. Cl.

| | |
|---|---|
| *H04N 19/147* | (2014.01) |
| *H04N 19/31* | (2014.01) |
| *H04N 19/169* | (2014.01) |
| *H04N 19/177* | (2014.01) |
| *G06N 3/08* | (2023.01) |
| *H04N 19/105* | (2014.01) |
| *H04N 19/124* | (2014.01) |
| *H04N 19/132* | (2014.01) |
| *H04N 19/109* | (2014.01) |
| *H04N 19/167* | (2014.01) |
| *G06N 3/045* | (2023.01) |

(52) U.S. Cl.
CPC ......... *H04N 19/172* (2014.11); *H04N 19/177* (2014.11); *H04N 19/1883* (2014.11); *H04N 19/31* (2014.11)

(56) References Cited

U.S. PATENT DOCUMENTS

| | | | | |
|---|---|---|---|---|
| 2010/0158120 | A1* | 6/2010 | Fang | H04N 19/172 375/E7.026 |
| 2013/0188738 | A1* | 7/2013 | Hannuksela | H04N 19/31 375/240.25 |
| 2016/0057418 | A1* | 2/2016 | Lei | H04N 19/60 375/240.03 |
| 2017/0339409 | A1* | 11/2017 | Socek | H04N 19/167 |
| 2019/0304067 | A1* | 10/2019 | Vogels | G06F 17/18 |
| 2020/0097830 | A1 | 3/2020 | Deng | |
| 2020/0304147 | A1* | 9/2020 | Choi | H03M 7/3059 |
| 2021/0127140 | A1* | 4/2021 | Hannuksela | H04N 19/176 |
| 2021/0326617 | A1* | 10/2021 | Feng | G06N 3/08 |
| 2021/0342976 | A1* | 11/2021 | Navarrete Michelini | G06T 5/007 |
| 2022/0046251 | A1* | 2/2022 | Zhu | H04N 19/147 |
| 2022/0067417 | A1* | 3/2022 | Banerjee | G06V 10/454 |

FOREIGN PATENT DOCUMENTS

| | | |
|---|---|---|
| CN | 103096076 A | 5/2013 |
| CN | 108235025 A | 6/2018 |
| CN | 110139101 A | 8/2019 |
| CN | 111193931 A | 5/2020 |
| CN | 111970511 A | 11/2020 |
| CN | 112203093 A | 1/2021 |
| KR | 20210004859 A | 1/2021 |

OTHER PUBLICATIONS

L. Li, B. Li, H. Li and C. W. Chen, "À Domain Optimal Bit Allocation Algorithm for High Efficiency Video Coding," in IEEE Transactions on Circuits and Systems for Video Technology, vol. 28, No. 1, pp. 130-142, Jan. 2018, doi: 10.1109/TCSVT.2016.2598672.*

Z. Cheng, H. Sun, M. Takeuchi and J. Katto, "Learned image compression with discretized gaussian mixture likelihoods and attention modules," in Proceedings of the IEEE/CVF Conference on Computer Vision and Pattern Recognition, pp. 7939-7948, 2020.

B. Bross, J. Chen, S. Liu and Y.- K. Wang, "Versatile Video Draft (Draft 10)," JVET-S2001, Joint Video Expters Team (JVET) of ITU-T SG 16 WP 3 and ISO/IEC JTC 1/SC 29/WG 11, 19th Meeting: by teleconference, Jun. 22-Jul. 1, 2020, 548 pages.

R. D. Dony and S. Haykin, "Neural network approaches to image compression," Proceedings of the IEEE, vol. 83, No. 2, pp. 288-303, 1995.

Z. Wang, A. C. Bovik, H. R. Sheikh, and E. P. Simoncelli, "Image quality assessment: From error visibility to structural similarity," IEEE Transactions on Image Processing, vol. 13, No. 4, pp. 600-612, 2004.

G. Bjontegaard, "Calculation of average PSNR differences between RD-curves," ITU-Telecommunications Standardization Sector Study Group 16 Question 6, Video Coding Experts (VCEG) Thirteenth Meeting: Austin, Texas USA, Apr. 2-4, 2001, Document: VCEG-M33, 4 pages.

C. E. Shannon, "A mathematical theory of communication," Bell System Technical Journal, vol. 27, No. 3, pp. 379-423, 1948.

H. Larochelle and I. Murray, "The neural autoregressive distribution estimator," in Proceedings of the Fourteenth International Conference on Artificial Intelligence and Statistics, 2011, pp. 29-37.

K. Gregor and Y. LeCun, "Learning representations by maximizing compression," arXiv preprint arXiv:1108.1169, Aug. 4, 2011, 8 pages.

B. Uria, I. Murray, and H. Larochelle, "RNADE: The real-valued neural autoregressive density-estimator," in NIPS, 2013, pp. 2175-2183.

Theis and M. Bethge, "Generative image modeling using spatial LSTMs," in NIPS, 2015, pp. 1927-1935.

B. Uria, I. Murray and H. Larochelle, "A deep and tractable density estimator," in ICML, 2014, pp. 467-475.

I. H. Witten, R. M. Neal, and J. G. Cleary, "Arithmetic coding for data compression," Communications of the ACM, vol. 30, No. 6, pp. 520-541, 1987.

A. van den Oord, N. Kalchbrenner, and K. Kavukcuoglu, "Pixel recurrent neural networks," in ICML, 2016, pp. 1747-1756.

A. van den Oord, N. Kalchbrenner, O. Vinyals, L. Espeholt, A. Graves, and K. Kavukcuoglu, "Conditional image generation with PixelCNN decoders," in NIPS, 2016, pp. 4790-4798.

T. Salimans, A. Karpathy, X. Chen, and D. P. Kingma, "PixelCNN++: Improving the PixelCNN with discretized logistic mixture likelihood and other modifications," arXiv preprint arXiv:1701.05517, 2017, 10 pages.

X. Chen, N. Mishra, M. Rohaninejad, and p. Abbeel, "PixelSNAIL: An improved autoregressive generative model," in ICML, 2018, pp. 863-871.

G. E. Hinton and R. R. Salakhutdinov, "Reducing the dimensionality of data with neural networks," Science, vol. 313, No. 5786, pp. 504-507, 2006.

G. Toderici, S. M. O'Malley, S. J. Hwang, D. Vincent, D. Minnen, S. Baluja, M. Covell, and R. Sukthankar, "Variable rate image compression with recurrent neural networks," arXiv preprint arXiv:1511.06085, 2015, 12 pages.

G. Toderici, D. Vincent, N. Johnston, S. J. Hwang, D. Minnen, J. Shor, and M. Covell, "Full resolution image compression with recurrent neural networks," in CVPR, 2017, pp. 5306-5314.

N. Johnston, D. Vincent, D. Minnen, M. Covell, S. Singh, T. Chinen, S. Jin Hwang, J. Shor, and G. Toderici, "Improved lossy image compression with priming and spatially adaptive bit rates for recurrent networks," in CVPR, 2018, pp. 4385-4393.

M. Covell, N. Johnston, D. Minnen, S. J. Hwang, J. Shor, S. Singh, D. Vincent, and G. Toderici, "Target-quality image compression with recurrent, convolutional neural networks," arXiv preprint arXiv:1705.06687, 2017.

J. Ballé, V. Laparra, and E. P. Simoncelli, "End-to-end optimization of nonlinear transform codes for perceptual quality," in PCS. IEEE, 2016, pp. 1-5.

J. Ballé, "Efficient nonlinear transforms for lossy image compression," in PCS, 2018, pp. 248-252.

J. Ballé, V. Laparra and E. P. Simoncelli, "End-to-end optimized image compression," in International Conference on earning Representations, 2017, 27 pages.

J. Ballé, D. Minnen, S. Singh, S. Hwang and N. Johnston, "Variational image compression with a scale hyperprior," in International Conference on Learning Representations, 2018, 47 pages.

D. Minnen, J. Ballé, G. Toderici, "Joint Autoregressive and Hierarchical Priors for Learned Image Compression", arXiv.1809.02736. 32nd Conference on Neural Information Processing Systems (NeurIPS 2018), Montreal, Canada, 10 pages.

Z.Cheng, H. Sun M. Takeuchi and J. Katto, "Learned image compression with discretized Gaussian mixture likelihoods and attention modules," in Proceedings of the IEEE/CVF Conference on Computer Vision and Pattern Recognition (CVPR), 2020, 10 pages.

(56) References Cited

OTHER PUBLICATIONS

Github repository "CompressAI: https://github.com/InterDigitalInc/CompressAI,", InterDigital Inc, accessed Dec. 2020, 6 pages.

T. Chen, H. Liu, Q. Shen, T. Yue, X. Cao, and Z. Ma, "DeepCoder: A deep neural network based video compression," in VCIP. IEEE, 2017, pp. 1-4.

C.-Y. Wu, N. Singhal, and p. Krahenbuhl, "Video compression through image interpolation," in Proceedings of the European Conference on Computer Vision (ECCV), 2018, pp. 416-431.

Z. Chen, T. He, X. Jin, and F. Wu, "Learning for video compression," IEEE Transactions on Circuits and Systems for Video Technology, DOI: 10.1109/TCSVT.2019.2892608, 2019, 11 pages.

G. Lu, W. Ouyang, D. Xu, X. Zhang, C. Cai, and Z. Gao, "DVC: An end-to-end deep video compression framework," in Proceedings of the IEEE/CVF Conference on Computer Vision and Pattern Recognition (CVPR), 2019.

O. Rippel, S. Nair, C. Lew, S. Branson, A. Anderson and L. Bourdev, "Learned Video Compression," 2019 IEEE/CVF International Conference on Computer Vision (ICCV), Seoul, Korea (South), 2019, pp. 3453-3462, doi: 10.1109/ICCV.2019.00355.

A. Habibian, T. Rozendaal, J. Tomczak and T. Cohen, "Video Compression with Rate-Distortion Autoencoders," in Proceedings of the IEEE/CVF International Conference on Computer Vision (ICCV), 2019, pp. 7033-7042.

J. Lin, D. Liu, H. Li and F. Wu, "M-LVC: Multiple frames prediction for learned video compression," in Proceedings of the IEEE/CVF Conference on Computer Vision and Pattern Recognition (CVPR), 2020, 9 pages.

E. Agustsson, D. Minnen, N. Johnston, J. Ballé, S. J. Hwang and G. Toderici, "Scale-Space Flow for End-to-End Optimized Video Compression," 2020 IEEE/CVF Conference on Computer Vision and Pattern Recognition (CVPR), Seattle, WA, USA, 2020, pp. 8500-8509, doi: 10.1109/CVPR42600.2020.00853.

X. Hu, Z. Chen, D. Xu, G. Lu, W. Ouyang and S. Gu, "Improving deep video compression by resolution-adaptive flow coding," in European Conference on Computer Vision (ECCV) 2020, 20 pages.

B. Li, H. Li, L. Li and J. Zhang, "$\lambda$ Domain Rate Control Algorithm for High Efficiency Video Coding," in IEEE Transactions on Image Processing, vol. 23, No. 9, pp. 3841-3854, Sep. 2014, doi: 10.1109/TIP.2014.2336550.

L. Li, B. Li, H. Li and C. W. Chen, "$\lambda$ Domain Optimal Bit Allocation Algorithm for High Efficiency Video Coding," in IEEE Transactions on Circuits and Systems for Video Technology, vol. 28, No. 1, pp. 130-142, Jan. 2018, doi: 10.1109/TCSVT.2016.2598672.

F. Bossen, Common Test Conditions and Software Reference Configurations, document Rec. JCTVC-J1100, Stockholm, Sweden, Jul. 2012, 3 pages.

N. Kamaci, Y. Altunbasak, and R. M. Mersereau, "Frame bit allocation for the h.264/avc video coder via cauchy-density-based rate and distortion models," IEEE Transactions on Circuits and Systems for Video Technology, vol. 15, No. 8, pp. 994-1006, 2005.

S. Mallat and F. Falzon, "Analysis of low bit rate image transform coding," IEEE Transactions on Signal Processing, vol. 46, No. 4, pp. 1027-1042, 1998.

Jun, S., "Deep learning based video encoding acceleration and intelligent bit allocation," China Excellent Masters Thesis Full Text Database (Electronic Journal) Jan. 15, 2021, 3 pages. With English Abstract.

\* cited by examiner

NEURAL NETWORK-BASED VIDEO COMPRESSION WITH BIT ALLOCATION

CROSS REFERENCE TO RELATED APPLICATIONS

This application is made to timely claim the priority to and benefits of U.S. Patent Application No. 63/141,059, filed on Jan. 25, 2021. All the aforementioned patent applications are hereby incorporated by reference in their entireties.

TECHNICAL FIELD

This patent document relates to generation, storage and consumption of digital audio video media information.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of a video or an image.

In one example aspect, a video processing method is disclosed. The method includes determining a target bitrate for a current video unit of a video that is based on a rate distortion function in which a rate portion is weighted using lambda, wherein lambda is a rational number and wherein lambda is adaptively adjusted for each video unit of the video; and performing a conversion between the current video unit and a bitstream of the video.

In another example aspect, a video processing method is disclosed. The method includes determining, using a neural network, a target bitrate for each temporal layer of a video having multiple temporal layers using a rate distortion function, wherein a rate portion of the rate distortion function is weighted using a temporal-layer specific lambda value, wherein each lambda value is a scaled version of a base lambda value, wherein the lambda values are rational numbers; and performing a conversion between the current video unit and a bitstream of the video.

In another example aspect, a video processing method is disclosed. The method includes performing a conversion between a video comprising a current video frame and a bitstream of the video according to a rule; wherein the current video frame is predictively coded using N reference frames, wherein N is an integer greater than 2.

In another example aspect, a video processing method is disclosed. The method includes determining target bitrates for video regions of a video unit according to a rate distortion function, wherein a rate portion of the rate distortion function is weighted using a region-specific lambda value for each video region; and performing a conversion between the current video unit and a bitstream of the video.

In another example aspect, a video processing method is disclosed. The method includes performing a conversion between a video comprising video frames and a bitstream of the video according to a rule; wherein the rule specifies that a current video frame of the video frames is coded in the bitstream using a residual frame that is coded using a residual that is based on an interpolated frame determined from multiple video frames.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

In yet another example aspect, a computer readable medium having a bitstream stored thereon is disclosed. The bitstream is generated or processed using a method described in the present document.

These, and other, features are described throughout the present document.

DETAILED DESCRIPTION

Figure 1:
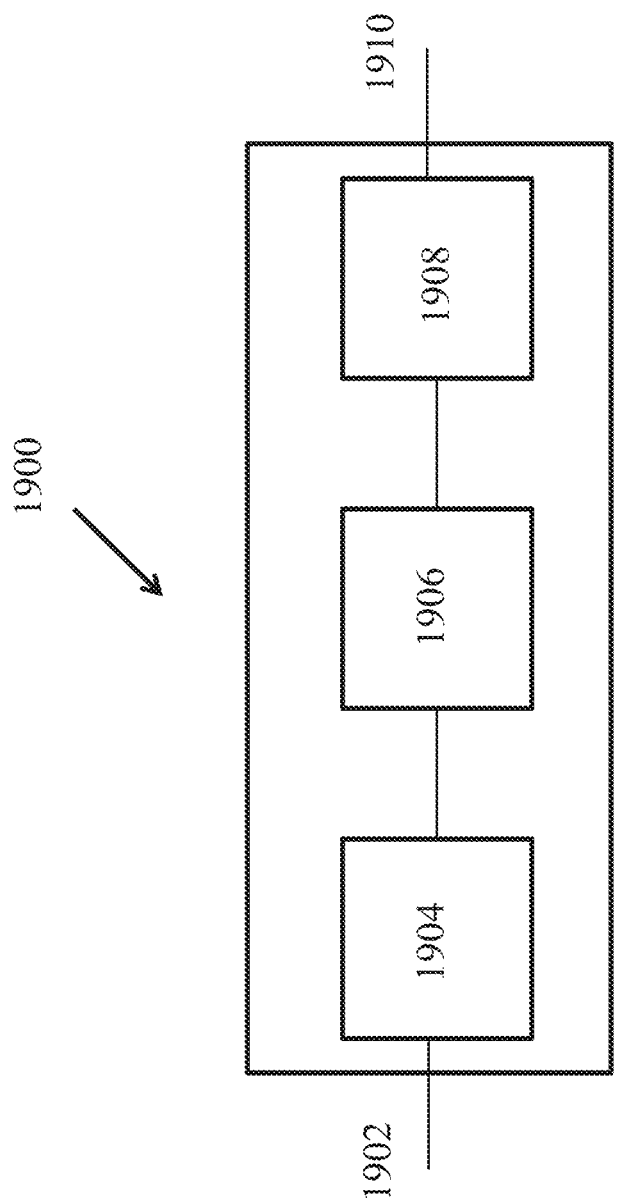
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present document, editing changes are shown to text by strikethrough indicating cancelled text and highlight indicating added text (including boldface italic), with respect to the current draft of the VVC specification or ISOBMFF file format specification.

1. Introduction

The present document relates to video compression using neural networks, and more particularly, to bit allocation for neural network-based (NN-based) video compression. It may be applied to end-to-end compression framework where all the modules are being optimized jointly. It may also be applicable to hybrid compression framework, where neural network-based coding tools are integrated into the framework of the existing video coding standards (e.g., HEVC, VVC) or future video coding standards.

The described techniques relate to improved algorithms and methods for the optimal rate-distortion (R-D) performance. Generally, the described techniques enable adaptive bit allocation in a neural network-based video coding system. That is, by adjusting the bit distribution for each hierarchical level to accommodate the inherent rate-distortion (R-D) characteristics of various sequences, providing a content-related bit allocation mechanism. For example, the adaptive bit allocation can adjust the percentage of bits among different pictures based on the video content such that important pictures can always be coded with better quality, leading to a better R-D performance. In addition, bit allocation can also be performed in basic unit (BU) level, i.e., adjusting the bits distribution for different small patches within a picture.

To further improve inter coding performance, techniques of multiple reference frames are presented herein. For example, when encoding frames in higher temporal layers, there are more than two reconstructed frames in the buffer, which can be leveraged to enhance the inter coding gains in addition to two basic reference frames.

To further exploit approaches for coding residue from inter prediction, techniques of prediction-aided residue coding are presented herein. For example, when compressing and decompressing the residue of the inter-predicted frames, the inter-predicted picture can provide additional information to help learn a more compact latent representation, thus leading to improved coding performance.

2. Video Coding Introduction

The past decade has witnessed the rapid development of deep learning in a variety of areas, especially in computer vision and image processing. Inspired from the great success of deep learning technology to computer vision areas, many researchers have shifted their attention from conventional image/video compression techniques to neural image/video compression technologies. Neural network was invented originally with the interdisciplinary research of neuroscience and mathematics. It has shown strong capabilities in the context of non-linear transform and classification. Neural network-based image/video compression technology has gained significant progress during the past half decade. It is reported that the latest neural network-based image compression algorithm achieves comparable R-D performance with Versatile Video Coding (VVC), the latest video coding standard developed by Joint Video Experts Team (JVET) with experts from MPEG and VCEG. With the performance of neural image compression continually being improved, neural network-based video compression has become an actively developing research area. However, neural network-based video coding still remains in its infancy due to the inherent difficulty of the problem.

2.1. Image/Video Compression

Image/video compression usually refers to the computing technology that compresses image/video into binary code to facilitate storage and transmission. The binary codes may or may not support losslessly reconstructing the original image/video, termed lossless compression and lossy compression. Most of the efforts are devoted to lossy compression since lossless reconstruction is not necessary in most scenarios. Usually the performance of image/video compression algorithms is evaluated from two aspects, i.e. compression ratio and reconstruction quality. Compression ratio is directly related to the number of binary codes, the less the better; Reconstruction quality is measured by comparing the reconstructed image/video with the original image/video, the higher the better.

Image/video compression techniques can be divided into two branches, the classical video coding methods and the neural-network-based video compression methods. Classical video coding schemes adopt transform-based solutions, in which researchers have exploited statistical dependency in the latent variables (e.g., DCT or wavelet coefficients) by carefully hand-engineering entropy codes modeling the dependencies in the quantized regime. Neural network-based video compression is in two flavors, neural network-based coding tools and end-to-end neural network-based video compression. The former is embedded into existing classical video codecs as coding tools and only serves as part of the framework, while the latter is a separate framework developed based on neural networks without depending on classical video codecs.

In the last three decades, a series of classical video coding standards have been developed to accommodate the increasing visual content. The international standardization organizations ISO/IEC has two expert groups namely Joint Photographic Experts Group (JPEG) and Moving Picture Experts Group (MPEG), and ITU-T also has its own Video Coding Experts Group (VCEG) which is for standardization of image/video coding technology. The influential video coding standards published by these organizations include JPEG, JPEG 2000, H.262, H.264/AVC and H.265/HEVC. After H.265/HEVC, the Joint Video Experts Team (JVET) formed by MPEG and VCEG has been working on a new video coding standard Versatile Video Coding (VVC). The first version of VVC was released in July 2020. An average of 50% bitrate reduction is reported by VVC under the same visual quality compared with HEVC.

Neural network-based image/video compression is not a new invention since there were a number of researchers working on neural network-based image coding. But the network architectures were relatively shallow, and the performance was not satisfactory. Benefit from the abundance of data and the support of powerful computing resources, neural network-based methods are better exploited in a variety of applications. At present, neural network-based image/video compression has shown promising improvements, confirmed its feasibility. Nevertheless, this technology is still far from mature and a lot of challenges need to be addressed.

2.2. Neural Networks

Neural networks, also known as artificial neural networks (ANN), are the computational models used in machine learning technology which are usually composed of multiple processing layers and each layer is composed of multiple simple but non-linear basic computational units. One benefit of such deep networks is believed to be the capacity for processing data with multiple levels of abstraction and converting data into different kinds of representations. Note that these representations are not manually designed; instead, the deep network including the processing layers is learned from massive data using a general machine learning procedure. Deep learning eliminates the necessity of hand-crafted representations, and thus is regarded useful especially for processing natively unstructured data, such as acoustic and visual signal, whilst processing such data has been a longstanding difficulty in the artificial intelligence field.

2.3. Neural Networks for Image Compression

Existing neural networks for image compression methods can be classified in two categories, i.e., pixel probability modeling and auto-encoder. The former one belongs to the predictive coding strategy, while the latter one is the transform-based solution. Sometimes, these two methods are combined together in literature.

2.3.1. Pixel Probability Modeling

According to Shannon's information theory, the optimal method for lossless coding can reach the minimal coding rate $-\log_2 p(x)$ where $p(x)$ is the probability of symbol x. A number of lossless coding methods were developed in literature and among them arithmetic coding is believed to be among the optimal ones. Given a probability distribution $p(x)$, arithmetic coding ensures that the coding rate to be as close as possible to its theoretical limit $-\log_2 p(x)$ without considering the rounding error. Therefore, the remaining problem is to how to determine the probability, which is however very challenging for natural image/video due to the curse of dimensionality.

Following the predictive coding strategy, one way to model p (x) is to predict pixel probabilities one by one in a raster scan order based on previous observations, where x is an image.

$$p(x)=p(x_1)p(x_2|x_1) \ldots p(x_i|x_1, \ldots, x_{i-1}) \ldots p(x_{m \times n}|x_1, \ldots, x_{m \times n-1}) \quad (1)$$

where m and n are the height and width of the image, respectively. The previous observation is also known as the context of the current pixel. When the image is large, it can be difficult to estimate the conditional probability, thereby a simplified method is to limit the range of its context.

$$p(x)=p(x_1)p(x_2|x_1) \ldots p(x_i|x_{i-k}, \ldots, x_{i-1}) \ldots p(x_{m \times n}|x_{m \times n-k}, \ldots, x_{m \times n-1}) \quad (2)$$

where k is a pre-defined constant controlling the range of the context.

It should be noted that the condition may also take the sample values of other color components into consideration. For example, when coding the RGB color component, R sample is dependent on previously coded pixels (including R/G/B samples), the current G sample may be coded according to previously coded pixels and the current R sample, while for coding the current B sample, the previously coded pixels and the current R and G samples may also be taken into consideration.

Neural networks were originally introduced for computer vision tasks and have been proven to be effective in regression and classification problems. Therefore, it has been proposed using neural networks to estimate the probability of $p(x_i)$ given its context $x_1, x_2, \ldots, x_{i-1}$. The pixel probability is proposed for binary images, i.e., $x_i \in \{-1, +1\}$. The neural autoregressive distribution estimator (NADE) is designed for pixel probability modeling in a feed-forward network with a single hidden layer. A similar work is presented, where the feed-forward network also has connections skipping the hidden layer, and the parameters are also shared. Experiments are performed on the binarized MNIST dataset. NADE is extended to a real-valued model RNADE, where the probability $p(x_i|x_1, \ldots, x_{i-1})$ is derived with a mixture of Gaussians. Their feed-forward network also has a single hidden layer, but the hidden layer is with rescaling to avoid saturation and uses rectified linear unit (ReLU) instead of sigmoid. NADE and RNADE are improved by using reorganizing the order of the pixels and with deeper neural networks.

Designing advanced neural networks plays an important role in improving pixel probability modeling. Multi-dimensional long short-term memory (LSTM) is proposed, which is working together with mixtures of conditional Gaussian scale mixtures for probability modeling. LSTM is a special kind of recurrent neural networks (RNNs) and is proven to be good at modeling sequential data. The spatial variant of LSTM is used for images. Several different neural networks are studied, including RNNs and CNNs namely PixelRNN and PixelCNN, respectively. In PixelRNN, two variants of LSTM, called row LSTM and diagonal BiLSTM are proposed, where the latter is specifically designed for images. PixelRNN incorporates residual connections to help train deep neural networks with up to 12 layers. In PixelCNN, masked convolutions are used to suit for the shape of the context. Comparing with previous works, PixelRNN and PixelCNN are more dedicated to natural images: they consider pixels as discrete values (e.g., 0, 1, . . . , 255) and predict a multinomial distribution over the discrete values; they deal with color images in RGB color space; they work well on large-scale image dataset ImageNet. Gated PixelCNN is proposed to improve the PixelCNN, and achieves comparable performance with PixelRNN but with much less complexity. PixelCNN++ is proposed with the following improvements upon PixelCNN: a discretized logistic mixture likelihood is used rather than a 256-way multinomial distribution; down-sampling is used to capture structures at multiple resolutions; additional short-cut connections are introduced to speed up training; dropout is adopted for regularization; RGB is combined for one pixel. PixelSNAIL is proposed, in which casual convolutions are combined with self-attention.

Most of the above methods directly model the probability distribution in the pixel domain. Some researchers also attempt to model the probability distribution as a conditional one upon explicit or latent representations. That being said, we may estimate $$p(x|h)=\Pi_{i=1}^{m \times n} p(x_i|x_1, \ldots, x_{i-1}, h) \quad (3)$$

where h is the additional condition and $p(x)=p(h)p(x|h)$, meaning the modeling is split into an unconditional one and a conditional one. The additional condition can be image label information or high-level representations.

2.3.2. Auto-Encoder

Auto-encoder originates from the well-known work proposed by Hinton and Salakhutdinov. The method is trained for dimensionality reduction and consists of two parts: encoding and decoding. The encoding part converts the high-dimension input signal to low-dimension representations, typically with reduced spatial size but a greater number of channels. The decoding part attempts to recover the high-dimension input from the low-dimension representation. Auto-encoder enables automated learning of representations and eliminates the need of hand-crafted features, which is also believed to be one of the most important advantages of neural networks.

Figure 8:
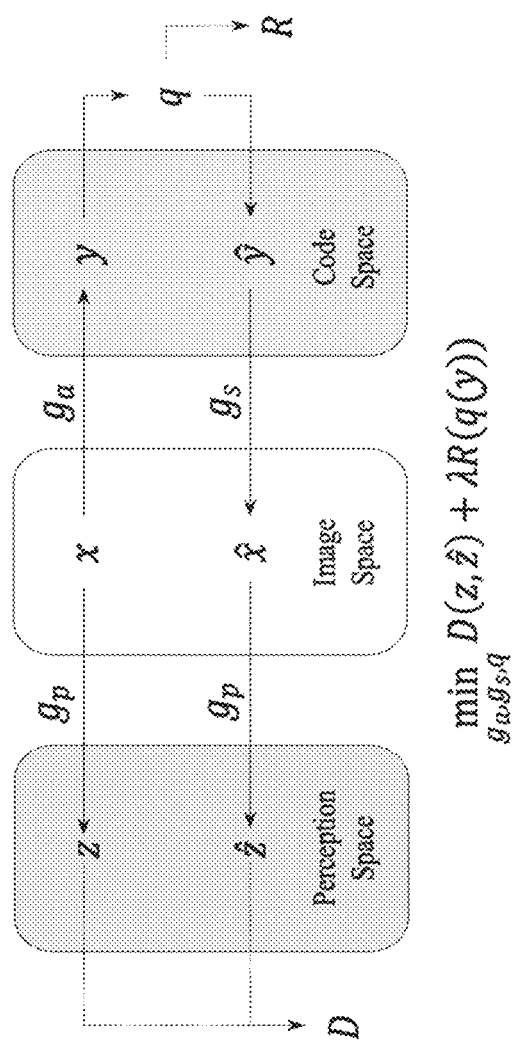
FIG. 8 is an illustration of a typical transform coding scheme.

FIG. 8 is an illustration of a typical transform coding scheme. The original image x is transformed by the analysis network $g_a$ to achieve the latent representation y. The latent representation y is quantized and compressed into bits. The number of bits R is used to measure the coding rate. The quantized latent representation $\hat{y}$ is then inversely transformed by a synthesis network $g_s$ to obtain the reconstructed image $\hat{x}$. The distortion is calculated in a perceptual space by transforming x and $\hat{x}$ with the function $g_p$.

It is intuitive to apply auto-encoder network to lossy image compression. Embodiments may only need to encode the learned latent representation from the well-trained neural networks. However, it is not trivial to adapt auto-encoder to image compression since the original auto-encoder is not optimized for compression thereby not efficient by directly using a trained auto-encoder. In addition, there exist other major challenges: First, the low-dimension representation should be quantized before being encoded, but the quantization is not differentiable, which is required in backpropagation while training the neural networks. Second, the objective under compression scenario is different since both the distortion and the rate need to be take into consideration. Estimating the rate is challenging. Third, a practical image coding scheme needs to support variable rate, scalability, encoding/decoding speed, interoperability. In response to these challenges, a number of researchers have been actively contributing to this area.

The prototype auto-encoder for image compression is in FIG. 8, which can be regarded as a transform coding strategy. The original image x is transformed with the analysis network $y=g_a(x)$, where y is the latent representation which will be quantized and coded. The synthesis network will inversely transform the quantized latent representation $\hat{y}$ back to obtain the reconstructed image $\hat{x}=g_s(\hat{y})$. The framework is trained with the rate-distortion loss function, i.e., $\mathcal{L}=D+\lambda R$, where D is the distortion between x and $\hat{x}$, R is the rate calculated or estimated from the quantized representation $\hat{y}$, and $\lambda$ is the Lagrange multiplier. It should be noted that D can be calculated in either pixel domain or perceptual domain. All existing research works follow this prototype and the difference might only be the network structure or loss function.

In terms of network structure, RNNs and CNNs are the most widely used architectures. In the RNNs relevant category, a general framework for variable rate image compression using RNN is proposed. They use binary quantization to generate codes and do not consider rate during training. The framework indeed provides a scalable coding functionality, where RNN with convolutional and deconvolution layers is reported to perform decently. An improved version by upgrading the encoder with a neural network similar to PixelRNN to compress the binary codes is proposed. The performance is reportedly better than JPEG on Kodak image dataset using MS-SSIM evaluation metric. The RNN-based solution is further improved by introducing hidden-state priming. In addition, an SSIM-weighted loss function is also designed, and spatially adaptive bitrates mechanism is enabled. They achieve better results than BPG on Kodak image dataset using MS-SSIM as evaluation metric. Spatially adaptive bitrates are supported by training stop-code tolerant RNNs.

A general framework for rate-distortion optimized image compression is proposed. The use multiary quantization to generate integer codes and consider the rate during training, i.e. the loss is the joint rate-distortion cost, which can be MSE or others. They add random noise to stimulate the quantization during training and use the differential entropy of the noisy codes as a proxy for the rate. They use generalized divisive normalization (GDN) as the network structure, which consists of a linear mapping followed by a nonlinear parametric normalization. The effectiveness of GDN on image coding is verified. Then an improved version is proposed, where they use 3 convolutional layers each followed by a down-sampling layer and a GDN layer as the forward transform. Accordingly, they use 3 layers of inverse GDN each followed by an up-sampling layer and convolution layer to stimulate the inverse transform. In addition, an arithmetic coding method is devised to compress the integer codes. The performance is reportedly better than JPEG and JPEG 2000 on Kodak dataset in terms of MSE. Furthermore, the method is improved by devising a scale hyper-prior into the auto-encoder. They transform the latent representation y with a subnet $h_a$ to $z=h_a(y)$ and z will be quantized and transmitted as side information. Accordingly, the inverse transform is implemented with a subnet $h_s$ attempting to decode from the quantized side information $\hat{z}$ to the standard deviation of the quantized $\hat{y}$, which will be further used during the arithmetic coding of $\hat{y}$. On the Kodak image set, their method is slightly worse than BGP in terms of PSNR. Further the structures in the residue space are exploited by introducing an autoregressive model to estimate both the standard deviation and the mean. In the latest work, Gaussian mixture model is used to further remove redundancy in the residue. The reported performance is on par with VVC on the Kodak image set using PSNR as evaluation metric.

2.4. Neural Networks for Video Compression

Similar to conventional video coding technologies, neural image compression serves as the foundation of intra compression in neural network-based video compression, thus development of neural network-based video compression technology comes later than neural network-based image compression but needs far more efforts to solve the challenges due to its complexity. Starting from 2017, a few researchers have been working on neural network-based video compression schemes. Compared with image compression, video compression needs efficient methods to remove inter-picture redundancy. Inter-picture prediction is then a crucial step in these works. Motion estimation and compensation is widely adopted but is not implemented by trained neural networks until recently.

Studies on neural network-based video compression can be divided into two categories according to the targeted scenarios: random access and the low-latency. In random access case, it requires the decoding can be started from any point of the sequence, typically divides the entire sequence into multiple individual segments and each segment can be decoded independently. In low-latency case, it aims at reducing decoding time thereby usually merely temporally previous frames can be used as reference frames to decode subsequent frames.

2.4.1. Low-Latency

A video compression scheme with trained neural networks is proposed. They first split the video sequence frames into blocks and each block will choose one from two available modes, either intra coding or inter coding. If intra coding is selected, there is an associated auto-encoder to compress the block. If inter coding is selected, motion estimation and compensation are performed with tradition methods and a trained neural network will be used for residue compression. The outputs of auto-encoders are directly quantized and coded by the Huffman method.

Another neural network-based video coding scheme with PixelMotionCNN is proposed. The frames are compressed in the temporal order, and each frame is split into blocks which are compressed in the raster scan order. Each frame will firstly be extrapolated with the preceding two reconstructed frames. When a block is to be compressed, the extrapolated frame along with the context of the current block are fed into the PixelMotionCNN to derive a latent representation. Then the residues are compressed by the variable rate image scheme. This scheme performs on par with H.264.

The real-sense end-to-end neural network-based video compression framework is proposed, in which all the modules are implemented with neural networks. The scheme accepts current frame and the prior reconstructed frame as inputs and optical flow will be derived with a pre-trained neural network as the motion information. The motion information will be warped with the reference frame followed by a neural network generating the motion compensated frame. The residues and the motion information are compressed with two separate neural auto-encoders. The whole framework is trained with a single rate-distortion loss function. It achieves better performance than H.264.

An advanced neural network-based video compression scheme is proposed. It inherits and extends traditional video coding schemes with neural networks with the following major features: 1) using only one auto-encoder to compress motion information and residues; 2) motion compensation with multiple frames and multiple optical flows; 3) an on-line state is learned and propagated through the following frames over time. This scheme achieves better performance in MS-SSIM than HEVC reference software.

An extended end-to-end neural network-based video compression framework is proposed based on the real-sense end-to-end neural network-based video compression framework. In this solution, multiple frames are used as references. It is thereby able to provide more accurate prediction of current frame by using multiple reference frames and associated motion information. In addition, motion field prediction is deployed to remove motion redundancy along temporal channel Postprocessing networks are also introduced in this work to remove reconstruction artifacts from previous processes. The performance is better than the real-sense end-to-end neural network-based video compression framework and H.265 by a noticeable margin in terms of both PSNR and MS-S SIM.

A scale-space flow to replace commonly used optical flow by adding a scale parameter is proposed based on framework of the real-sense end-to-end neural network-based video compression framework. It is reportedly achieving better performance than H.264.

A multi-resolution representation for optical flows is proposed based on the real-sense end-to-end neural network-based video compression framework. Concretely, the motion estimation network produces multiple optical flows with different resolutions and let the network to learn which one to choose under the loss function. The performance is slightly improved compared with the real-sense end-to-end neural network-based video compression framework and better than H.265.

2.4.2. Random Access

A neural network-based video compression scheme with frame interpolation is proposed. The key frames are first compressed with a neural image compressor and the remaining frames are compressed in a hierarchical order. They perform motion compensation in the perceptual domain, i.e. deriving the feature maps at multiple spatial scales of the original frame and using motion to warp the feature maps, which will be used for the image compressor. The method is reportedly on par with H.264.

A method for interpolation-based video compression is proposed, wherein the interpolation model combines motion information compression and image synthesis, and the same auto-encoder is used for image and residual.

A neural network-based video compression method based on variational auto-encoders with a deterministic encoder is proposed. Concretely, the model consists of an auto-encoder and an auto-regressive prior. Different from previous methods, this method accepts a group of pictures (GOP) as inputs and incorporates a 3D autoregressive prior by taking into account of the temporal correlation while coding the laten representations. It provides comparative performance as H.265.

2.5. Preliminaries

Almost all the natural image/video is in digital format. A grayscale digital image can be represented by $x \in \mathbb{D}^{m \times n}$, where $\mathbb{D}$ is the set of values of a pixel, m is the image height and n is the image width. For example, $\mathbb{D} = \{0, 1, 2, \ldots, 255\}$ is a common setting and in this case $|\mathbb{D}|=256=2^8$, thus the pixel can be represented by an 8-bit integer. An uncompressed grayscale digital image has 8 bits-per-pixel (bpp), while compressed bits are definitely less.

A color image is typically represented in multiple channels to record the color information. For example, in the RGB color space an image can be denoted by $x \in \mathbb{D}^{m \times n \times 3}$ with three separate channels storing Red, Green and Blue information. Similar to the 8-bit grayscale image, an uncompressed 8-bit RGB image has 24 bpp. Digital images/videos can be represented in different color spaces. The neural network-based video compression schemes are mostly developed in RGB color space while the traditional codecs typically use YUV color space to represent the video sequences. In YUV color space, an image is decomposed into three channels, namely Y, Cb and Cr, where Y is the luminance component and Cb/Cr are the chroma components. The benefits come from that Cb and Cr are typically down sampled to achieve pre-compression since human vision system is less sensitive to chroma components.

A color video sequence is composed of multiple color images, called frames, to record scenes at different timestamps. For example, in the RGB color space, a color video can be denoted by $X = \{x_0, x_1, \ldots, x_t, \ldots, x_{T-1}\}$ where T is the number of frames in this video sequence, $x \in \mathbb{D}^{m \times n}$. If m=1080, n=1920, $|\mathbb{D}|=2^8$, and the video has 50 frames-per-second (fps), then the data rate of this uncompressed video is 1920×1080×8×3×50=2,488,320,000 bits-per-second (bps), about 2.32 Gbps, which needs a lot storage thereby definitely needs to be compressed before transmission over the internet.

Usually the lossless methods can achieve compression ratio of about 1.5 to 3 for natural images, which is clearly below requirement. Therefore, lossy compression is developed to achieve further compression ratio, but at the cost of incurred distortion. The distortion can be measured by calculating the average squared difference between the original image and the reconstructed image, i.e., mean-squared-error (MSE). For a grayscale image, MSE can be calculated with the following equation.

$$MSE = \frac{\|x - \hat{x}\|^2}{m \times n} \qquad (4)$$

Accordingly, the quality of the reconstructed image compared with the original image can be measured by peak signal-to-noise ratio (PSNR):

$$PSNR = 10 \times \log_{10} \frac{(\max(\mathbb{D}))^2}{MSE} \qquad (5)$$

where max($\mathbb{D}$) is the maximal value in $\mathbb{D}$, e.g., 255 for 8-bit grayscale images. There are other quality evaluation metrics such as structural similarity (SSIM) and multi-scale SSIM (MS-SSIM).

To compare different lossless compression schemes, it is sufficient to compare either the compression ratio given the resulting rate or vice versa. However, to compare different lossy compression methods, it has to take into account both the rate and reconstructed quality. For example, to calculate the relative rates at several different quality levels, and then to average the rates, is a commonly adopted method; the average relative rate is known as Bjontegaard's delta-rate (BD-rate). There are other important aspects to evaluate image/video coding schemes, including encoding/decoding complexity, scalability, robustness, and so on.

3. Examples of Technical Problems Solved by Disclosed Technical Solutions

The following problems remain in existing neural network-based video compression solutions:
1. Bit allocation scheme is sub-optimal in existing solutions. Uniform bit allocation is used for different temporal layers, i.e., assigning the same number of bits to all temporal layers, which is not the optimal solution since there exists "quality dependency". However, in the classical video codecs (e.g., H.264, H.265), bit allocation is an important tool to push the R-D performance towards the theoretical optima. It is reported that using hierarchical bit allocation brings about 8.4% bits saving on average. However, bit allocation for neural network-based video compression has not been investigated in prior art. The frames which are more frequently referenced should be coded with better quality to reduce the distortion propagated to the subsequent frames, thereby should be assigned with more bits, and vice versa.
2. Existing random-access methods fail to fully use the available information to predict current frame. When predicting/interpolating current frame, e.g., more than two reference frames can be used to improve the prediction accuracy, depending on its decoding order.
3. Existing methods fail to consider bit allocation within a frame, i.e., spatial bit allocation. To achieve the optimal R-D performance, bit allocation should be differentiated in a frame for different areas based on its textures.
4. The available information has not been fully exploited to code the residuals from the interpolated frames. The interpolated/predicted frames can be used as additional information to enhance the residual coding.

4. Examples of Technical Solutions

The itemized solutions and embodiments below should be considered as examples to explain general concepts. These items should not be interpreted in a narrow way. Furthermore, these items can be combined in any manner.

The techniques described herein provide a neural network-based video compression method with bit allocation. By assigning different number of bits to different temporal layers, the system provides a better R-D performance in accordance with the "quality dependency" phenomenon. Not only bit allocation exists temporally, but also spatially. Spatial bit allocation is also described herein for assigning different number of bits to different areas within a frame. In summary, the invention includes the following claims:

1. Instead of using the same lambda value (which corresponds to the derivation of target bitrate) for all pictures within one video, it is proposed to use adaptively adjusted lambda values for coding one video.
    a. In one example, for a given target bitrate, a base (e.g., sequence-level) lambda value is firstly derived. In addition, for a video unit to be coded, a scaling factor is further derived/selected which is applied to the base lambda value, and the scaled lambda value (denoted as final lambda value) is utilized to code the video unit.
        i. In one example, the scaling factors and/or the given scaling factor and/or the final lambda value may be selected from a given scaling factor set.
            a) In one example, the given scaling factor set may include {1.0, 0.25, 0.20, 0.08}.
        ii. In one example, the scaling factor and/or the given scaling factor set and/or the final lambda value may be dependent on the target bitrates.
        iii. In one example, the scaling factor and/or the given scaling factor set and/or the final lambda value may be dependent on the coding order of pictures.
        iv. In one example, the scaling factor and/or the given scaling factor set and/or the final lambda value may be dependent on the temporal layer id (e.g., the TemporalId in VVC).
            a) Alternatively, furthermore, the scaling factor may be increased with the increased temporal layer indices.
            b) Alternatively, furthermore, the scaling factor may be decreased with the increased temporal layer indices.
            c) Alternatively, furthermore, the scaling factor may be set to the same value for two layers with consecutive temporal layer indices.
            d) Alternatively, furthermore, the scaling factor may be set to 1 for a given temporal layer id (e.g., the adjusted lambda value is equal to the base lambda value).
        v. In one example, the scaling factor and/or the given scaling factor set and/or the final lambda value may be dependent on the location of one video unit, e.g., close to certain boundary (e.g., picture boundary, slice boundary, tile boundary) or not.
        vi. In one example, the scaling factor and/or the given scaling factor set and/or the final lambda value may be dependent on the color component.
            a) In one example, for a first (e.g., the Y color component) and second color (e.g., the Cb or Cr color component) components, the final lambda may be set to different values.
            b) In one example, for a first (e.g., the Y color component) and second color (e.g., the Cb or Cr color component) components, the final lambda may be set to different values; while for the second and a third color components, the final lambda may be set to same values.
                a. In one example, the Cb and Cr components may share the same values which is different from that used for coding the Y color component.
                b. In one example, the B and R components may share the same values which is different from that used for coding the G color component.

c. In one example, the G and B components may share the same values which is different from that used for coding the R color component.
b. Alternatively, for a given target bitrate and for a video unit to be coded, a lambda value may be directly derived from the given target bitrate.
c. In one example, the video unit is a picture/slice/tile/subpicture.
d. In one example, the video unit is a CTU row/CTU/CTB/CU/PU/TU/CB/TB/VPDU/region within a picture/slice/tile/subpicture.
e. In one example, the video unit is one or multiple pixels/samples within a CTU.
f. In one example, more than one neural network may be produced for one lambda.
  i. For example, different neural network may be produced for one lambda with different scaling factors.
  ii. In one example, it may be signaled to the decoder which neural network is used for one lambda.
2. A temporal bit allocation method for neural network-based video compression, including determining corresponding base lambda value for a given target bitrate, determining scaling factors for the adjusted lambda value from each temporal layer.
  a. In one example, the bit allocation method may be dependent on the structure of group of pictures (GOP), such as the size of GOP and the reference picture setting.
3. Current frame can be predicted from more than two reference frames in the decoded picture buffer.
  a. In one example, how many frames to be utilized may depend on the temporal layer id/coding order etc. al.
  b. In one example, the max number of reference frames is defined (e.g. denoted as C). When the number of available reference frames exceed the max number, the closest C reference frames in terms of temporal distance are utilized.
  c. In one example, different reference frames may be used for different regions for a neural network-based coding scheme.
4. A spatial bit allocation method is proposed which assigns different number of bits to different areas within a video unit (e.g., a picture/slice/tile/subpicture/CTU row/CTU). The spatial bit allocation is deployed by either adjusting the lambda value with a scaling factor applied to the base lambda value or adjusting the quantization step, based on the characteristics of a spatial location and/or other information.
  a. In one example, when using adjusted lambda values, the scaling factor of a spatial location of the latent representation is determined on-the-fly or selected from a given candidate set.
    i. Alternatively, furthermore, the determination of scaling factor may depend on the information mentioned in bullet 1 (e.g., temporal layer id).
  b. In one example, information related to NN-based video compression may be signaled for one or multiple or all spatial regions of a picture.
  c. In one example, the characteristics of a patch can be measured in pixel/sample space, perceptual space or any other spaces.
    i. In one example, criteria in the pixel/sample space may include entropy, gradient, etc.
    ii. In one example, criteria in the perceptual space may include a perceptual score derived from a pre-trained neural network, etc.
    iii. In one example, the above methods may be applied when using adjusted quantization step,
5. The interpolated frame is used as additional information to enhance residual coding.
  a. In one example, the interpolated frame is concatenated with the residual frame and then taken as input at both encoder and decoder side.
  b. In one example, the individual features are first extracted from the interpolated frame and the residue frame and then fused together at both encoder and decoder side.

5. Embodiment Examples

Bit allocation is a useful technique in video compression, which is a critical step in rate control. We present an end-to-end neural video compression scheme with hierarchical bit allocation. Existing methods are limited in using uniform bit allocation for different temporal layers. The raw video sequences are compressed in group of pictures (GOP) in the hierarchical order. Bit allocation is developed based on the R-A model. All the modules are jointly optimized with a single rate-distortion loss function. Progressive training strategy is used optimize the entire scheme. An example is provided in the following subsections.

5.1. Framework

Figure 9:
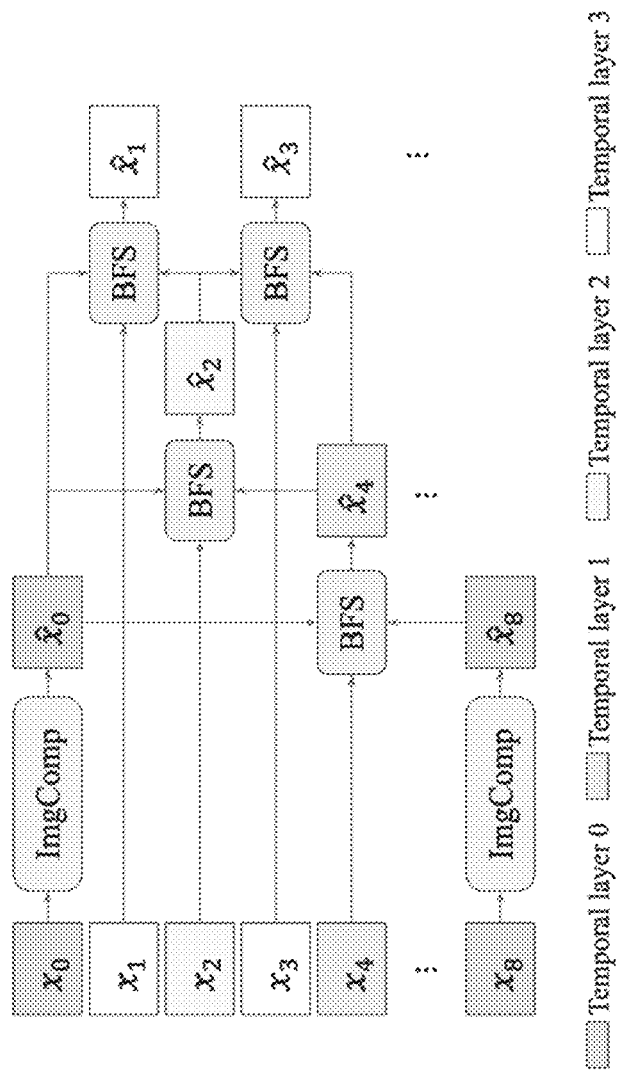
FIG. 9 shows an example framework of a proposed video processing method.

FIG. 9 shows an example framework of the proposed method. The raw video sequences are divided into group of pictures (GOP). In each GOP, the keyframes are compressed with image compression methods, the remaining frames are synthesized with the bi-directional frame synthesis (BFS) module.

Let $X=\{x_0, x_1, \ldots, x_t, \ldots\}$ denote the video sequences. $x_t$, $\bar{x}_t$ and $\hat{x}_t$ represent the original, predicted/interpolated and reconstructed/decoded frames at time t. $r_t$ and $\hat{r}_t$ are the residual and reconstructed residual between the original frame and the predicted frame.

We present the basic version (using 2 reference frames) in this section and multi-frame version is described in Section 5.2. FIG. 9 illustrates the proposed end-to-end neural network-based video compression scheme. The original video sequences are divided into GOPs. Each GOP consists of N consecutive frames and can be encoded and decoded independently. Two consecutive GOPs share the boundary frame.

Figure 10:
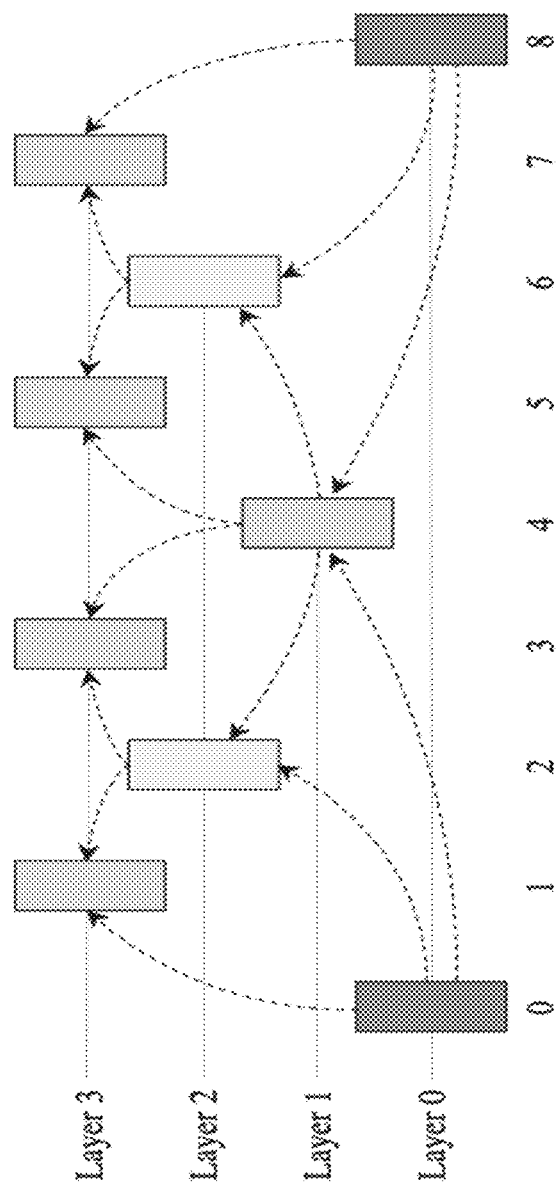
FIG. 10 shows an exemplar of hierarchical compression structure in a group of pictures (GOP).

FIG. 10 shows an exemplar of hierarchical compression structure in a group of pictures (GOP).

The first and last frames in a GOP are keyframes, which are directly compressed with an image compression method. The intermediate frames are synthesized in a hierarchical order as shown in FIG. 10 and Equation 6, where $h_\psi$ is the video frame interpolation network.

$$x_{\frac{N}{2}} = h_\psi(\hat{x}_0, \hat{x}_N)$$

$$x_{\frac{N}{4}} = h_\psi(\hat{x}_0, \hat{x}_{\frac{N}{2}})$$

$$x_{\frac{3N}{4}} = h_\psi(\hat{x}_{\frac{N}{2}}, x_N)$$

(6)

Loss function is the averaged R-D loss of the entire GOP as follows.

$$\mathcal{L} = \frac{1}{N+1} \sum_{i=0}^{N} (\lambda_i R_i + D_i) \quad (7)$$

where N is GOP size; $R_i$ and $D_i$ are bits-per-pixel and distortion of frame i, respectively; and $\lambda_i$ is lambda value used for training and depends on the temporal layer it belongs to. Details of deriving $\lambda_i$ is described in Section 5.3.

5.2. Multi-Frame Interpolation

Figure 11:
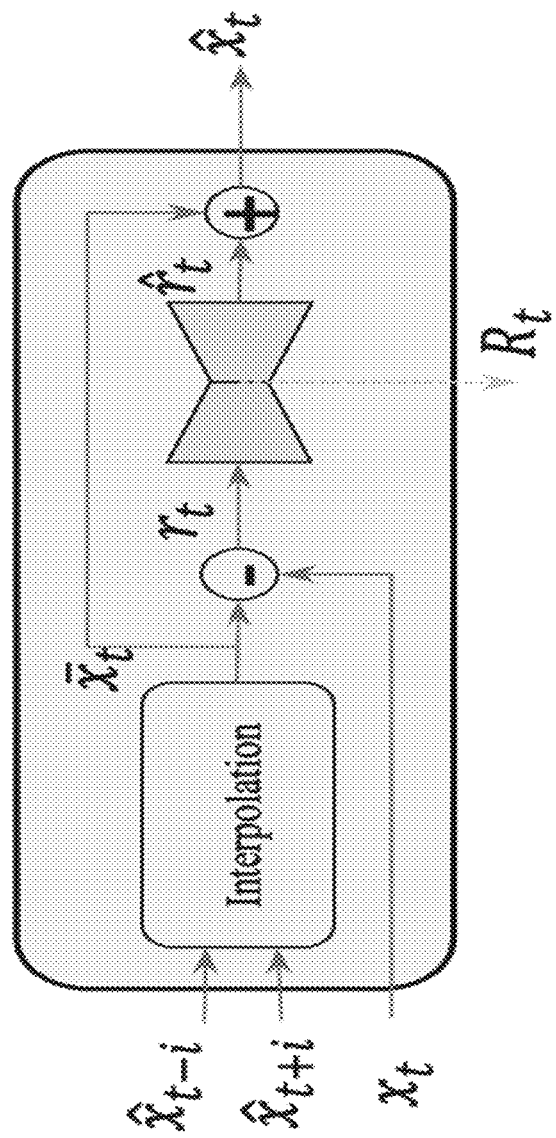
FIG. 11 shows an example of a bi-directional frame synthesis (BFS) module.

FIG. 11 shows an example of a bi-directional frame synthesis (BFS) module.

The bi-directional frame synthesis (BFS) module accepts two or more reference frames and generates the reconstructed frame. Two steps are included in this module: interpolation and residual coding. Interpolation aims at deriving the predicted frame given the reference frames, while residual coding encodes the difference between the predicted frame and its original frame. Interpolation network could be any form neural networks as long as multiple inputs are supported. Residual coding network should be an auto-encoder type neural network. When more than two reference frames are available in a decoded frame buffer, more reference frames can be incorporated for interpolation. In one example when GOP size is 8, reference frames used to interpolate current frame are tabulated in Table 1.

TABLE 1

Exemplar of reference frame list used to interpolate current frame when GOP size is 8.

| Current Frame | Reference Frames |
|---|---|
| $x_4$ | $x_0, x_8$ |
| $x_2$ | $x_0, x_4, x_8$ |
| $x_6$ | $x_0, x_4, x_8$ |
| $x_1$ | $x_0, x_2, x_4$ |
| $x_3$ | $x_0, x_2, x_4$ |
| $x_5$ | $x_4, x_6, x_8$ |
| $x_7$ | $x_4, x_6, x_8$ |

It should be noted that the number of reference frames should not be limited to a fixed number.

a. In one example, when interpolating $x_5$, not only $x_4$, $x_6$, $x_8$ are used, one or more other available reference frames may also be used, e.g., $x_0$, $x_1$, $x_2$, $x_3$.

A separate BFS module needs to be trained if the number of inputs differs. For example, a BFS module with three reference frames inputs needs a separate set of network coefficients as a BFS module with two reference frames inputs. In addition, when the relative temporal distance relationships change, a separate BFS module may need to be trained. For example, a BFS module used to interpolate $x_1$ using $x_0, x_2, x_4$ might be different from a BFS module used to interpolate $x_3$ using $x_0, x_2, x_4$.

5.3. Prediction-Aided Residual Coding

Figure 12:
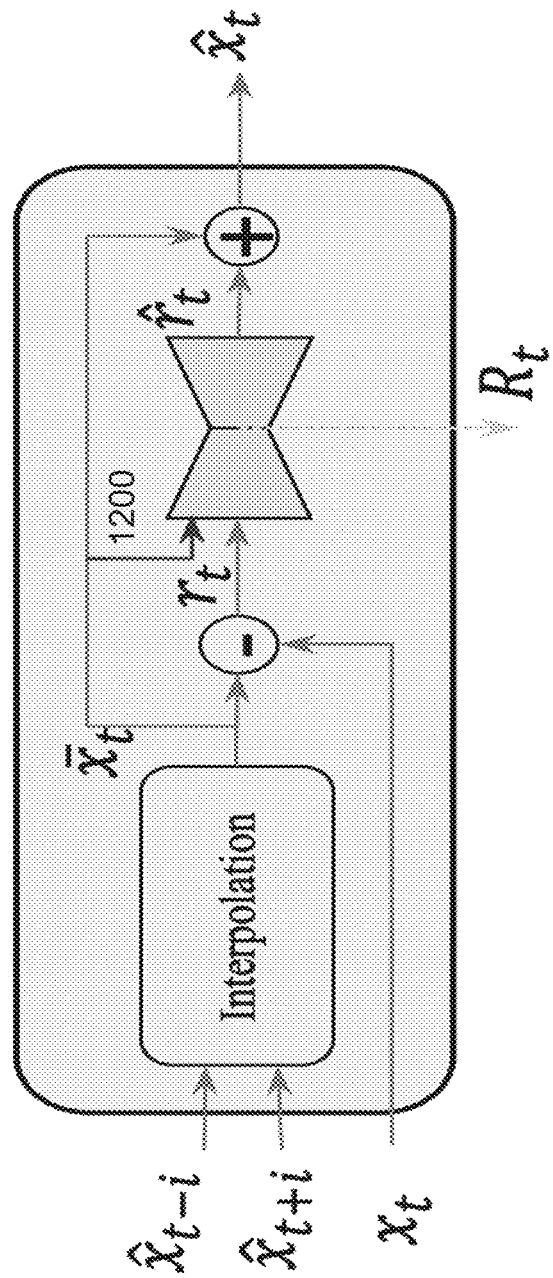
FIG. 12 is an illustration of a prediction-aided residual coding example.

FIG. 12 is an illustration of prediction-aided residual coding. The interpolated frame $\bar{x}_t$ is also fed into the auto-encoder (marked in red, numbered 1200) assisting the residual coding process.

To fully leverage the available information for a better R-D performance, the interpolated frame $\bar{x}_t$ is also used as auxiliary information to code the residual. As illustrated in FIG. 12, the auto-encoder not only accepts $r_t$, but also $\bar{x}_t$ to assist the residual coding

5.4. Temporal Bit Allocation

5.4.1. R-λ Rate Control Model

In classical video coding techniques, λ is the slope of R-D curve. When combining this information with the Hyperbolic R-D model, we obtain λ expressed as follows.

$$\lambda = -\frac{\partial D}{\partial R} = CK \cdot R^{-K-1} \triangleq \alpha R^\beta \quad (8)$$

$$\text{with } \alpha = \left(\frac{1}{CK}\right)^{-\frac{1}{K+1}}, \beta = -\frac{1}{K+1}$$

where C and K are model parameters related to the characteristics of the video content. Equation 8 shows the R-D relation can be described in λ domain.

5.4.2. Bit Allocation for Neural Video Compression

Since there exists "quality dependency" in a GOP between the frames, i.e. the quality of the current frame typically has a significant influence on the quality of subsequent frames. Therefore, we should compress important pictures with smaller distortion. Since $\lambda_i$ is the key factor to determine the bitrate and distortion of a specific picture, the picture level bit allocation can be formulated as selecting the appropriate $\lambda_i$ for each picture to minimize the total distortion of all the pictures in a GOP. It has been proven that the λ value of the current picture should be inversely proportional to its influence on the whole sequence in order to optimize the picture level bit allocation as shown in Equation 9.

$$\frac{\lambda_i}{\lambda_j} = \frac{1+\theta_j}{1+\theta_i} = \frac{\omega_i}{\omega_j}, i, j = 1, 2, \ldots, N. \quad (9)$$

where $\omega_i$ is the weighting factor applied to λ from the base temporal layer.

To select the appropriate $\omega_i$ for the current picture, we develop a bit allocation model based on the method. The frames with the same temporal identification should use the same λ. Without loss of generality, we set $\omega_i$ for frames in temporal layer 0 as the basis for bit allocation. It should be noted that we penalize D instead of R in the loss function. Based on the $\omega_i$ settings, the adapted $\omega_i$ settings for end-to-end neural network-based video compression are tabulated in Table 2.

TABLE 2

$\omega_i$ for hierarchical bit allocation

| Temporal layer identification (Level) | $\omega_i(\rho > \rho_0)$ | $\omega_i(\rho \leq \rho_0)$ |
|---|---|---|
| 0 | 1.0 | 1.0 |
| 1 | 1.0/(0.725 ln($\lambda_L$) + 0.7963) | 0.2500 |
| 2 | 1.0/(0.943 ln($\lambda_L$) + 1.0352) | 0.2000 |
| 3 | 1.0/(2.356 ln($\lambda_L$) + 2.5880) | 0.0813 | where ρ represents the target bitrate and $\rho_0$ is the boundary target bitrate, determining which formula to use in Table 2 for deriving $\omega_i$. $\omega_i$ is calculated as follows.

$$\lambda = \alpha \cdot \rho^\beta \quad (10)$$

where α=3.2003 and β=−1.367. Accordingly, the boundary bitrate $\rho_0$ can be calculated as follows.

$$\rho_0 = \left(\frac{90}{\alpha}\right)^{\frac{1}{\beta}} \quad (11)$$

$\lambda_L$ is derived with Equation 10 given the target bitrate. It should be noted that we can adjust p to achieve different rate-distortion performance but it is a relative concept, not referring to the resulting bitrate since the actual bitrate heavily depends on the video content and relevant optimization parameters. The model may have different $\alpha$ and $\beta$ values for different cases. In addition, different picture level also has different model parameters when hierarchical bit allocation is applied. For example, if GOP size is 8, there exist 4 picture levels; and each picture level may have its own pairs of $\alpha$ and $\beta$. Even within the same picture level, the values of $\alpha$ and $\beta$ heavily depend on the video content and the actual bitrate. Therefore, multiple p values might need to be tried for each running point to find the one with better rate-distortion performance.

5.5. Spatial Bit Allocation

Existing quantization in neural network-based video compression is replaced with additive uniform noise. Therefore, the equivalent quantization step is 1. However, different areas of a frame might need different number of bits to reach the optimal R-D performance. The proposed spatial bit allocation can be deployed with either adjusted lambda value or adjusted quantization step.

When using adjusted lambda values, a scaling factor with respect to the base lambda value is derived for each spatial location. The current location patch uses the adjusted lambda value instead of the base lambda value. The scaling factors of each spatial location of the latent representations is determined on-the-fly or selected from a given candidate set. The base lambda value, denoted as $\lambda_0$, is specified by user.
1. When using a pre-defined candidate list to derive the scaling factor, in one example, the candidate list can be defined as $\gamma=\{0.5, 0.8, 1.5, 2.8\}$.
2. When deriving the scaling factors on-the-fly, the scaling factor can be formulated as follows. It should be noted that the values of the parameters ($\pi$, $\eta$ and $\kappa$) in the equation depend on the video content, the optimization parameters and the specified evaluation criterion.

$$\gamma = \pi\eta^\kappa \quad (12)$$

When using the adjusted quantization steps, multiple quantization models are trained and saved, wherein each quantization model corresponds to a separate quantization step. Quantization model selection is based on the user-specified evaluation criterion on the current patch. The spatial bit allocation using adjusted quantization steps is described as follows.
1. A set of quantization steps $Q=\{q_0, q_1, \ldots, q_{K-1}\}$, ($q_0 > q_1 > \ldots > q_{K-1}$) is pre-defined.
2. The input frames are split into small patches of size H×W.
3. A set of threshold values $T=\{\tau_0, \tau_1, \ldots, \tau_{K-2}\}$ are defined from the patch or the latent representations (i.e. feature maps) using certain evaluation criterion as described in Section 4-4.c.
4. When the network accepts an input patch, latent representations are derived, based on which a quantization step $q_i$, ($i \in \{0, 1, \ldots, K-1\}$) is selected if the specified evaluation criterion of current patch satisfies:

$$\tau_{i-1} \leq H(x) < \tau_i \quad (13)$$

where $H(x)$ represents the evaluated score of the input patch x using the specified evaluation criterion.

Determining the quantization step set is based on the network architecture, input pixel value range, etc. In one example, it can be defined as $Q=\{2.0, 1.6, 1.2, 0.8, 0.4\}$. It should be noted that the intervals may not be equal, e.g., a quantization set of $Q=\{1.8, 1.0, 0.4, 0.2\}$ is also possible.

When deciding the threshold value set T, a pre-trained image compression network can be used to derive the statistical results of the latent representations. In one example, a large number of images are split into patches and fed through a pre-trained image impression network to derive the feature maps at the bottleneck. Entropy is calculated over the derived feature maps and the threshold values are set as the vertical locations at the intersection points when horizontal axis is proportional to quantization steps as defined in Q.

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 2:
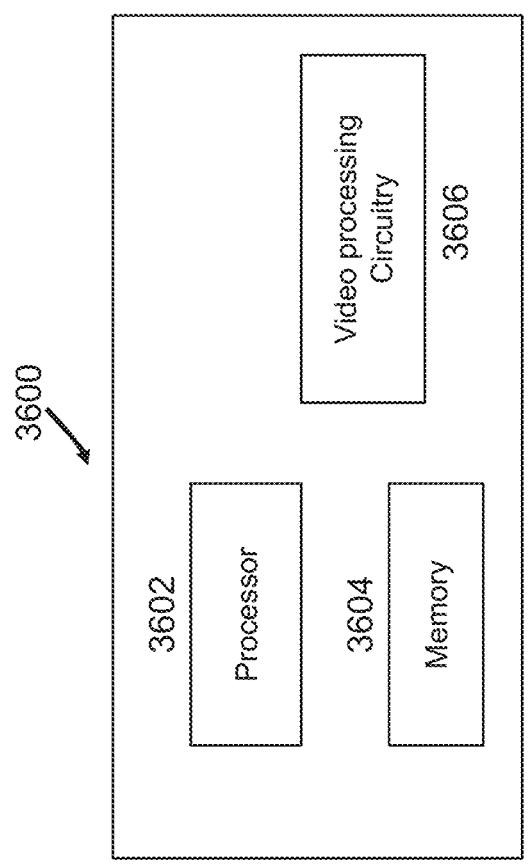
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing circuitry 3606. The processor(s) 3602 may be configured to implement one or more methods described in the present document. The memory (memories) 3604 may be used for storing data and code used for implementing the methods and techniques described herein. The video processing circuitry 3606 may be used to implement, in hardware circuitry, some techniques described in the present document. In some embodiments, the video processing circuitry 3606 may be at least partly included in the processor 3602, e.g., a graphics co-processor.

Figure 4:
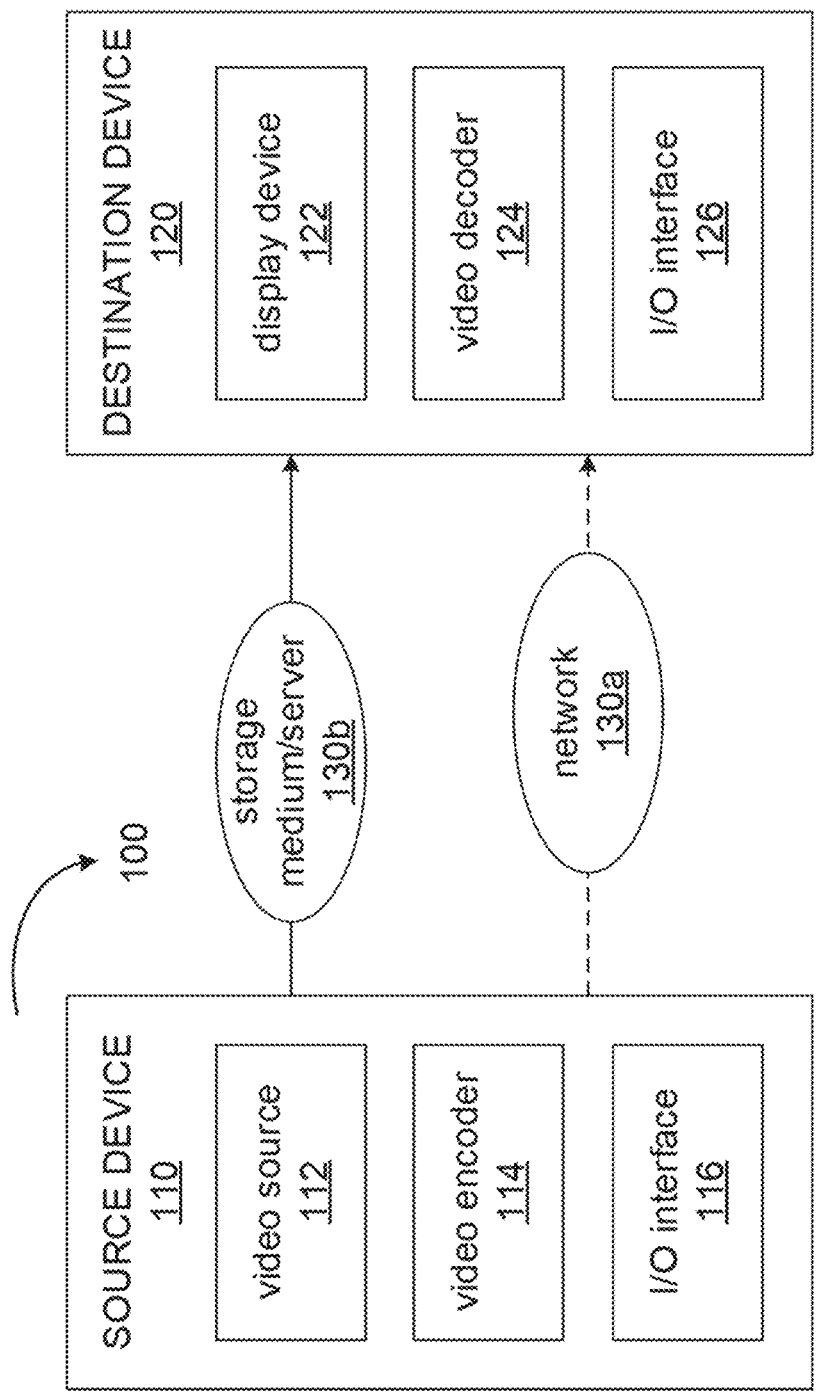
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 5:
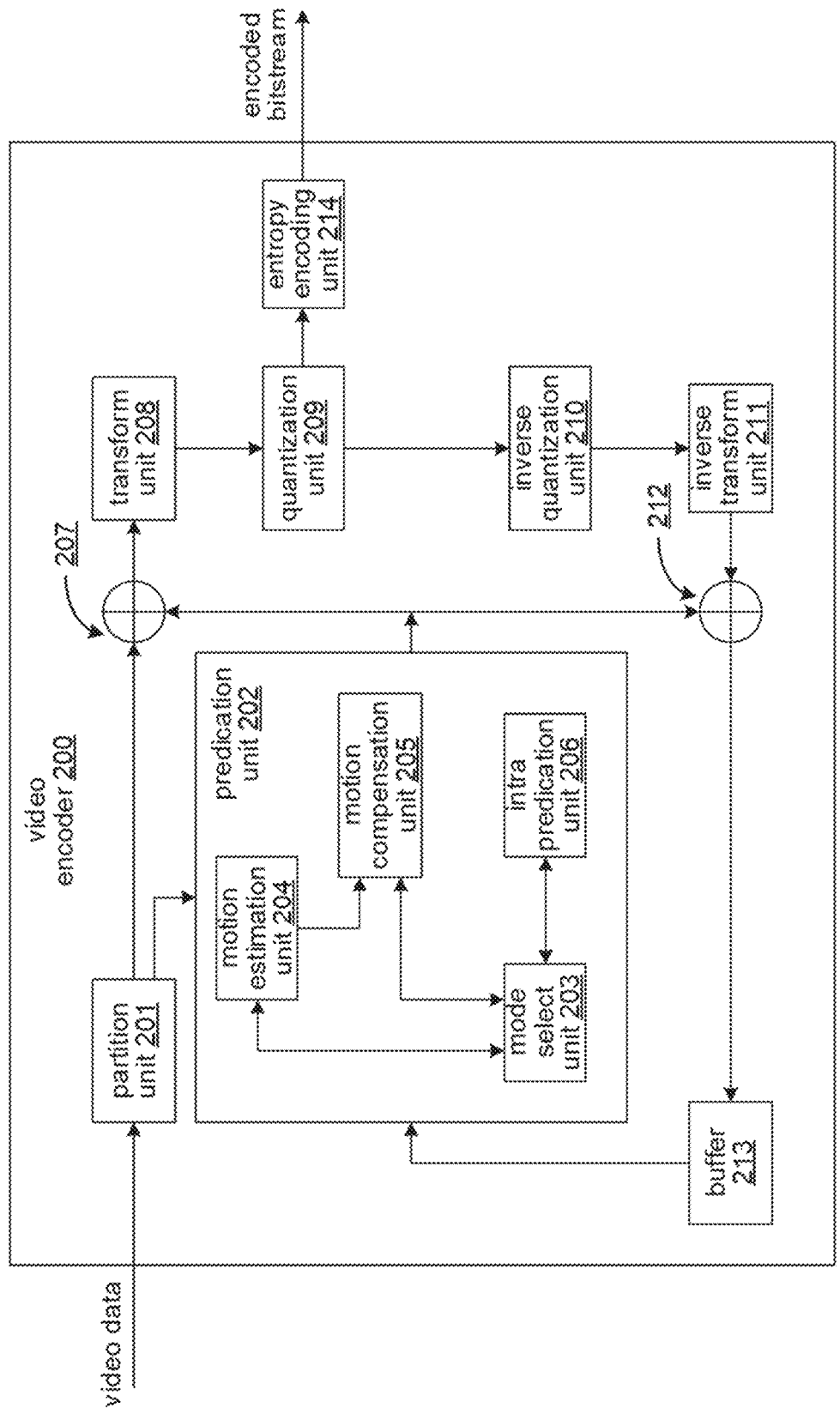
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, a loop filtering operation may be performed to reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
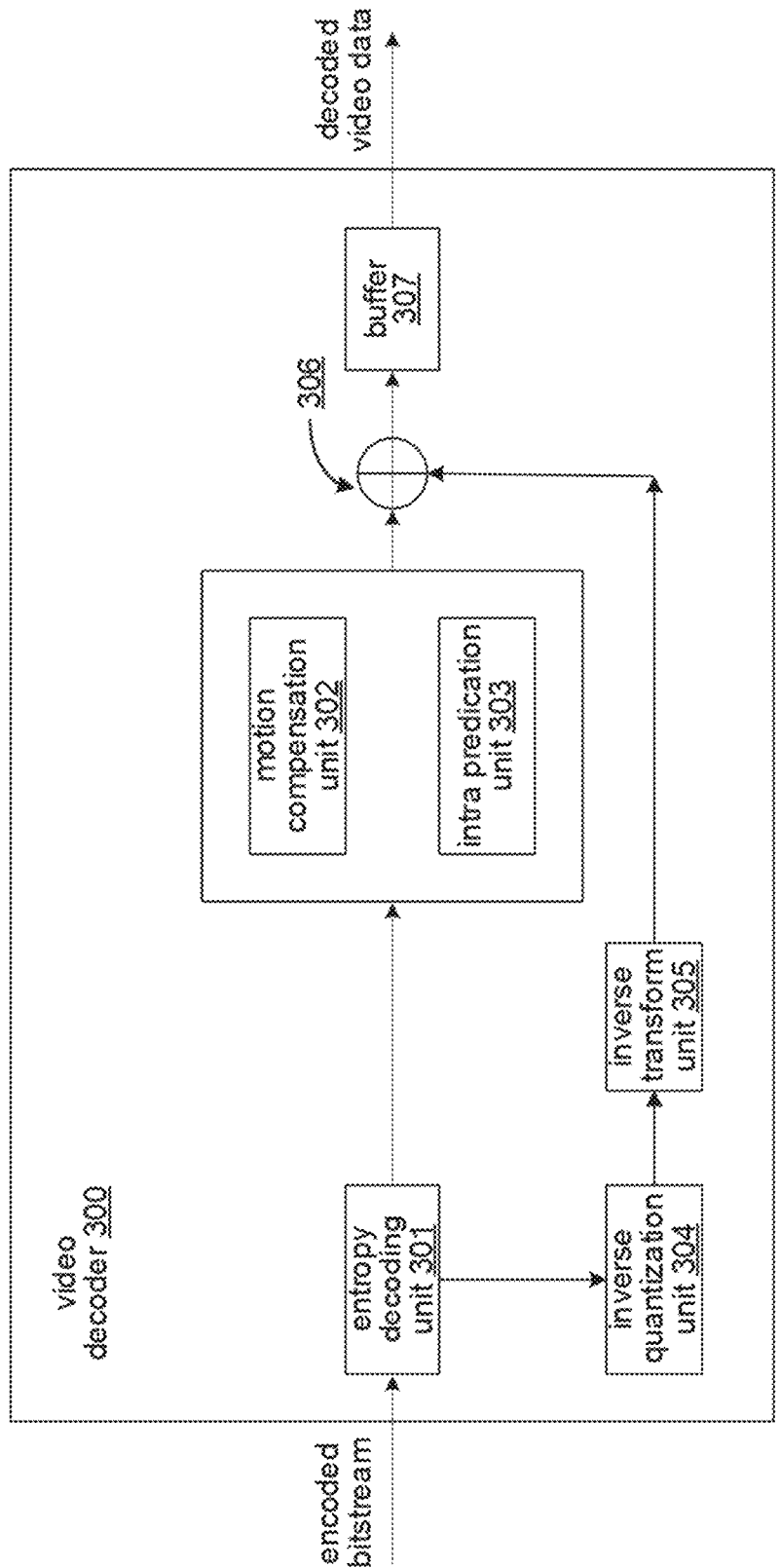
FIG. 6 is a block diagram that illustrates a decoder in accordance with some embodiments of the present disclosure.
Figure 7:
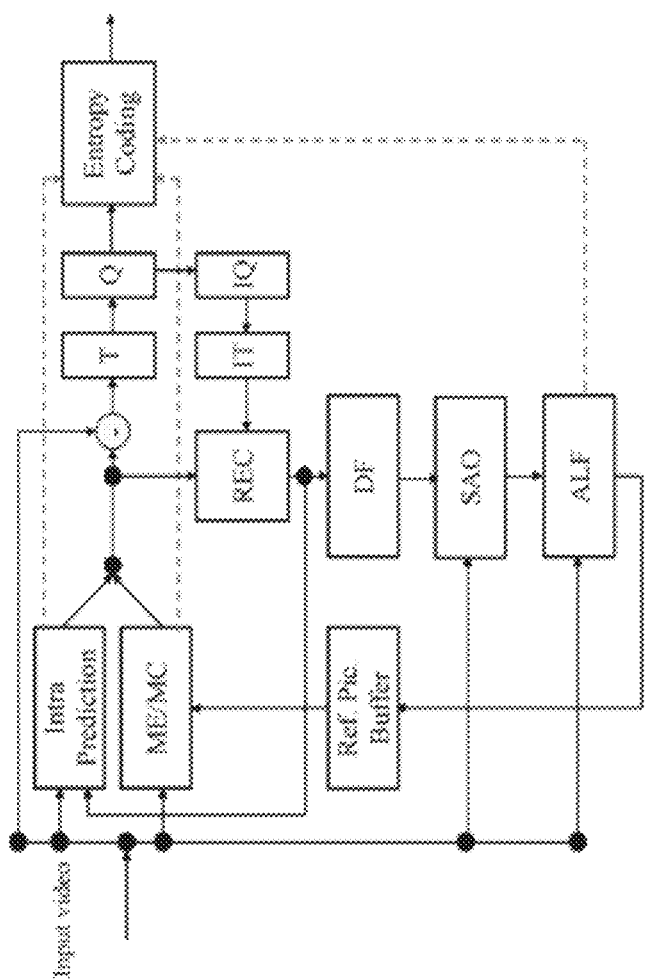
FIG. 7 shows an example of encoder block diagram.

FIG. 6 is a block diagram illustrating an example of video decoder 300 which may be video decoder 114 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes, for example, received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

The following solutions show example embodiments of techniques discussed in the previous section (e.g., item 1).

Figure 3:
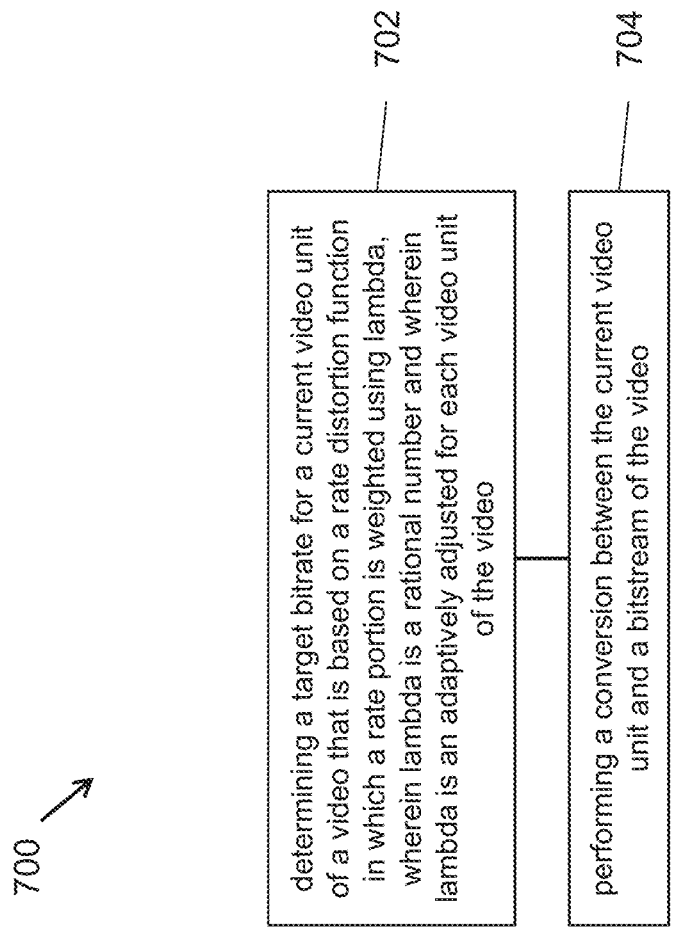
FIG. 3 is a flowchart for an example method of video processing.

1. A visual media processing method (e.g., method 700 depicted in FIG. 3), comprising determining (702) a target bitrate for a current video unit of a video that is based on a rate distortion function in which a rate portion is weighted using lambda, wherein lambda is a rational number and wherein lambda is adaptively adjusted for each video unit of the video; and performing (704) a conversion between the current video unit and a bitstream of the video.

2. The method of solution 1, wherein lambda is adaptively adjusted for each video unit of the video based on a base lambda value for the video that is scaled on a per video unit basis.

3. The method of any of solutions 1-2, wherein lambda value of each video unit is adjusted responsive to a target bitrate for each video unit.

4. The method of any of solutions 1-3, wherein the lambda value is adjusted using multiple neural networks trained for determining values for multiple video units.

5. The method of solutions 1-4, wherein the video unit is a coding tree unit row or a coding tree unit or a coding tree block or a coding unit or a prediction unit or a transform unit or a coding block or a transform block or a virtual pipeline data unit or a picture or a slice or a tile or a subpicture.

6. The method of any of solutions 1-4, wherein the video unit is a subset of pixels within a coding tree unit.

The following solutions show example embodiments of techniques discussed in the previous section (e.g., item 2).

7. A method of video processing, comprising: determining, using a neural network, a target bitrate for each temporal layer of a video having multiple temporal layers using a rate distortion function, wherein a rate portion of the rate distortion function is weighted using a temporal-layer specific lambda value, wherein each lambda value is a scaled version of a base lambda value, wherein the lambda values are rational numbers; and performing a conversion between the current video unit and a bitstream of the video.

8. The method of solution 7, wherein the lambda values for the temporal layers are responsive to a structure of a group of pictures (GOP).

9. The method of solution 8, wherein the structure of the GOP includes a size of the GOP or a reference picture setting for the GOP.

The following solutions show example embodiments of techniques discussed in the previous section (e.g., item 3).

10. A method of video processing, comprising: performing a conversion between a video comprising a current video frame and a bitstream of the video according to a rule; wherein the current video frame is predictively coded using N reference frames, wherein N is an integer greater than 2.

11. The method of solution 10, wherein N depends on a temporal layer identifier of the current video frame.

12. The method of solutions 10-11, wherein N depends on a coding order of the current video frame.

13. The method of any of solutions 10-12, wherein the rule specifies a number C that represents a maximum value that N can take for the video, and wherein, in case that C is greater than N, then the N reference frames correspond to N temporally closest reference frames to the current video frame.

14. The method of any of solutions 10-13, wherein a neural network determines reference frames used for different video regions of the current video frames.

The following solutions show example embodiments of techniques discussed in the previous section (e.g., item 4).

15. A method of video processing, comprising: determining target bitrates for video regions of a video unit according to a rate distortion function, wherein a rate portion of the rate distortion function is weighted using a region-specific lambda value for each video region; and performing a conversion between the current video unit and a bitstream of the video.

16. The method of solution 15, wherein the region-specific lambda values are obtained by applying scaling factors to a base lambda value.

17. The method of solution 15, wherein a given region-specific lambda value is obtained by adjusting quantization step of a corresponding video region or a position of the corresponding video region within the video unit.

18. The method of any of solutions 15-17, wherein the video unit comprises a video picture, a slice, tile, a subpicture, a coding tree unit row or a coding tree unit.

The following solutions show example embodiments of techniques discussed in the previous section (e.g., item 5).

19. A method of video processing, comprising: performing a conversion between a video comprising video frames and a bitstream of the video according to a rule; wherein the rule specifies that a current video frame of the video frames is coded in the bitstream using a residual frame that is coded using a residual that is based on an interpolated frame determined from multiple video frames.

20. The method of solution 19, wherein the interpolated frame is concatenated with the residual frame for coding.

21. The method of solution 19, wherein individual features are first extracted from the interpolated frame and the residual frame and fused together during the conversion.

22. A video decoding apparatus comprising a processor configured to implement a method recited in one or more of solutions 1 to 21.

23. A video encoding apparatus comprising a processor configured to implement a method recited in one or more of solutions 1 to 21.

24. A computer program product having computer code stored thereon, the code, when executed by a processor, causes the processor to implement a method recited in any of solutions 1 to 21.

25. A computer readable medium on which a bitstream complying to a bitstream format that is generated according to any of solutions 1 to 21.

26. A method comprising generating a bitstream according to a method recited in any of solutions 1 to 21 and writing the bitstream to a computer readable medium.

27. A method, an apparatus, a bitstream generated according to a disclosed method or a system described in the present document.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

Appendix A, attached herewith, provides additional embodiments and simulation results of video encoding or decoding performed using a neural network based technique described in the present document.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of video processing, comprising:
   determining, for a conversion between a current video unit of a current video frame of a video and a bitstream of the video, a target bitrate for the current video unit that is based on a rate distortion function in which a rate portion is weighted using lambda, wherein the lambda is a rational number, wherein the lambda is adaptively adjusted for each video unit of the video, and wherein the lambda is adjusted using multiple neural networks, and different neural networks in the multiple neural networks are trained for determining values of lambda for different video units; and
   performing the conversion based on the determining.

2. The method of claim 1, wherein lambda for the current video unit is scaled based on at least one scaling factor, and the at least one scaling factor depends on at least one of a scaling factor set, the target bitrate, a coding order, a temporal layer identifier for the current video unit, a location of the current video unit, and color component.

3. The method of claim 1, wherein lambda for the current video unit is based on the target bitrate for the current video unit.

4. The method of claim 1, wherein the current video unit is a coding tree unit row or a coding tree unit or a coding tree block or a coding unit or a prediction unit or a transform unit or a coding block or a transform block or a virtual pipeline data unit or a picture or a slice or a tile or a subpicture or a subset of pixels within a coding tree unit.

5. The method of claim 1, wherein lambda for the current video unit is based on a temporal layer identifier for the current video frame.

6. The method of claim 5, wherein the lambda for the current video unit is based on a structure of a group of pictures (GOP) of the video, and the structure of the GOP includes a size of the GOP or a reference picture setting for the GOP.

7. The method of claim 1, wherein lambda for a current region within the current video unit is obtained by applying a scaling factor to a base lambda value, or adjusting a quantization step based on related information, and the lambda is adaptively adjusted for each video region of the current video unit of the video.

8. The method of claim 7, wherein the scaling factor is determined on the fly or selected from a candidate set.

9. The method of claim 7, wherein the related information is signaled for one or multiple or all spatial regions for a picture of the video, the related information comprises characteristics of a spatial location for the current region, and the characteristics are measured in a sample space or perceptual space.

10. The method of claim 1, wherein the current video frame is predictively coded using N reference frames, wherein N is an integer greater than 2, and N depends on a temporal layer identifier for the current video frame or a coding order of the current video frame.

11. The method of claim 10, wherein, in case that a number of available reference frames is greater than C, the N reference frames correspond to C temporally closest reference frames to the current video frame, with C being a maximum number of reference frames for the video.

12. The method of claim 10, wherein a neural network determines reference frames used for different video regions of the current video unit.

13. The method of claim 1, wherein the current video frame is coded in the bitstream using a residual frame that is coded using a residual that is based on an interpolated frame determined from multiple video frames of the video.

14. The method of claim 13, wherein the interpolated frame is concatenated with the residual frame for the conversion.

15. The method of claim 13, wherein individual features are extracted from the interpolated frame and the residual frame and fused together during the conversion.

16. The method of claim 1, wherein the conversion includes encoding the current video unit into the bitstream.

17. The method of claim 1, wherein the conversion includes decoding the current video unit from the bitstream.

18. An apparatus for processing video data comprising a processor and a non-transitory memory with instructions thereon, wherein the instructions upon execution by the processor, cause the processor to:
   determine, for a conversion between a current video unit of a current video frame of a video and a bitstream of the video, a target bitrate for the current video unit that is based on a rate distortion function in which a rate portion is weighted using lambda, wherein the lambda is a rational number, wherein the lambda is adaptively adjusted for each video unit of the video, and wherein the lambda is adjusted using multiple neural networks, and different neural networks in the multiple neural networks are trained for determining values of lambda for different video units; and
   perform the conversion based on the determining.

19. A non-transitory computer-readable recording medium storing a bitstream of a video which is generated by a method performed by a video processing apparatus, wherein the method comprises:
   determining, for a current video unit of a current video frame of a video, a target bitrate for the current video unit that is based on a rate distortion function in which a rate portion is weighted using lambda, wherein the lambda is a rational number, wherein the lambda is adaptively adjusted for each video unit of the video, and wherein the lambda is adjusted using multiple neural networks, and different neural networks in the multiple neural networks are trained for determining values of lambda for different video units; and
   generating the bitstream based on the determining.

* * * * *